US012683242B2

(12) United States Patent
Cheng et al.

(10) Patent No.: US 12,683,242 B2
(45) Date of Patent: Jul. 14, 2026

(54) BATTERY SEPARATOR AND COATING PROCESS THEREOF, COATING SYSTEM AND BATTERY

(71) Applicant: SHANGHAI ENERGY NEW MATERIALS TECHNOLOGY CO., LTD., Shanghai (CN)

(72) Inventors: Yue Cheng, Shanghai (CN); Chenbo Liao, Shanghai (CN); Yongle Chen, Shanghai (CN); Zhi Zhuang, Shanghai (CN); Huajing Shan, Shanghai (CN); Qianqian Liu, Shanghai (CN)

(73) Assignee: SHANGHAI ENERGY NEW MATERIALS TECHNOLOGY CO., LTD., Shanghai (CN)

( * ) Notice: Subject to any disclaimer, the term of this patent is extended or adjusted under 35 U.S.C. 154(b) by 569 days.

(21) Appl. No.: 18/034,641

(22) PCT Filed: Sep. 14, 2021

(86) PCT No.: PCT/CN2021/118234
§ 371 (c)(1),
(2) Date: Apr. 28, 2023

(87) PCT Pub. No.: WO2022/089065
PCT Pub. Date: May 5, 2022

(65) Prior Publication Data
US 2024/0014509 A1 Jan. 11, 2024

(30) Foreign Application Priority Data
Nov. 2, 2020 (CN) .......................... 202011187428.3

(51) Int. Cl.
*H01M 50/403* (2021.01)
*H01M 50/417* (2021.01)
(Continued)

(52) U.S. Cl.
CPC ....... *H01M 50/403* (2021.01); *H01M 50/417* (2021.01); *H01M 50/434* (2021.01); (Continued)

(58) Field of Classification Search
CPC ............. H01M 50/403; H01M 50/417; H01M 50/434; H01M 50/446; H01M 50/449; (Continued)

(56) References Cited

U.S. PATENT DOCUMENTS

| | | | | |
|---|---|---|---|---|
| 2013/0101889 A1* | 4/2013 | Mizuno | .............. | H01M 50/451 428/220 |
| 2016/0149185 A1* | 5/2016 | Yoon | ................... | H01M 50/443 429/144 |
| 2018/0190957 A1* | 7/2018 | Honda | ...................... | B32B 5/22 |

FOREIGN PATENT DOCUMENTS

| | | |
|---|---|---|
| CN | 104269506 A | 1/2015 |
| CN | 105702899 A | 6/2016 |

(Continued)

OTHER PUBLICATIONS

International Search Report of PCT/CN2021/118234.
Written Opinion of PCT/CN2021/118234.

*Primary Examiner* — Eugenia Wang
(74) *Attorney, Agent, or Firm* — Troutman Pepper Locke LLP; Tim Tingkang Xia, Esq.

(57) ABSTRACT
The present disclosure relates to the field of lithium battery separators, and aims to provide a battery separator and a coating process thereof, a coating system and a battery. The coating process includes: initial heat setting of a polyolefin membrane, online coating of the polyolefin membrane, and heat setting of a coating membrane. The coating system includes a plurality of drying ovens disposed in a travel route of heat setting of a polyolefin membrane, and a coating apparatus for coating a coating slurry on the polyolefin membrane, which is disposed at a spacing position of
(Continued)

Travel direction of PE membrane setting adjacent drying ovens. When the online coating flow is disposed before the end of the heat setting of the polyolefin membrane, the polyolefin base membrane and the coating slurry are dried by using the temperature of the heat setting drying oven of the polyolefin membrane.

4 Claims, 2 Drawing Sheets

(51) Int. Cl.

| | |
|---|---|
| *H01M 50/434* | (2021.01) |
| *H01M 50/446* | (2021.01) |
| *H01M 50/449* | (2021.01) |
| *H01M 50/451* | (2021.01) |
| *H01M 50/457* | (2021.01) |
| *H01M 50/489* | (2021.01) |

(52) U.S. Cl.
CPC ....... *H01M 50/446* (2021.01); *H01M 50/449* (2021.01); *H01M 50/451* (2021.01); *H01M 50/457* (2021.01); *H01M 50/489* (2021.01)

(58) Field of Classification Search
CPC . H01M 50/451; H01M 50/457; H01M 50/489
See application file for complete search history.

(56) References Cited

FOREIGN PATENT DOCUMENTS

| | | | |
|---|---|---|---|
| CN | 109285981 | A | 1/2019 |
| CN | 113054319 | A | 6/2021 |
| JP | 2016032934 | A | 3/2016 |
| KR | 1020160118979 | A | 10/2016 |
| TW | 201819198 | A | 6/2018 |
| WO | 2016157656 | A1 | 10/2016 |

* cited by examiner

BATTERY SEPARATOR AND COATING PROCESS THEREOF, COATING SYSTEM AND BATTERY

CROSS-REFERENCE TO RELATED APPLICATIONS

This Application is a national stage application of PCT/CN2021/118234. This application claims priorities from PCT Application No. PCT/CN2021/118234, filed Sep. 14, 2021, and from the Chinese patent application 202011187428.3 filed Nov. 2, 2020, the content of which are incorporated herein in the entirety by reference.

TECHNICAL FIELD

The present disclosure relates to the field of lithium battery separators, and in particular to a battery separator and a coating process thereof, a coating system, and a battery.

BACKGROUND

Lithium ion batteries usually consist mainly of a positive electrode, a negative electrode, a separator, an electrolyte, and a battery shell. In the structure of lithium ion batteries, the separator is one of the key inner components. Along with the development of lithium ion batteries toward high energy density, high capacity, and high power density, there is a more urgent demand for a high-performance separator.

For single-layer coated separators, the characteristics of heat resistance and moisture of the battery separators prepared by a traditional process are to be further improved to ensure the safety of the batteries. Furthermore, a traditional separator has a porosity of about 40%. Poor thickness consistency, low porosity, poor separator flatness, and the like result in a large internal resistance of the separator, which severely affects battery cycle, high rate discharge, etc. In addition, due to the complex traditional process, the poor flatness of the separator, and the like, the final cutting yield will be very low, greatly increasing costs.

The ceramic coating and the polymer coating membrane having bonding function are composited to increase the separator's heat resistance shrinkage performance and the separator's liquid absorption and locking capability, so as to improve the cycle performance of the battery and the safety of the battery to some degree. However, each coating layer of the composite coating product needs to go through coating, drying, winding, and unwinding steps. In this case, the production line is extended and the processing costs are increased. The complex process results in a low yield of the products. Furthermore, a coated separator composited by two coating layers generally cannot achieve a desired effect in heat resistance, moisture, porosity, bonding capability, consistency, and the like. As mentioned in the prior arts, if a coating amount of the composite coating layers is increased to increase the heat resistance and the bonding performance, the internal resistance of the separator will be excessively increased, leading to failure to consider safety performance and electrochemical performance at the same time.

SUMMARY

In order to address the technical shortcomings of the prior arts, the present disclosure provides a coated battery separator with high bonding performance and heat resistance.

In order to achieve the above objective, the present disclosure provides the following technical scheme.

There is provided a coating process of a battery separator, which sequentially includes initial heat setting of a polyolefin membrane, online coating of the polyolefin membrane, and heat setting of a coating membrane.

Furthermore, there is provided a coating system for a battery separator, including: a plurality of drying ovens disposed in a travel route of heat setting of a polyolefin membrane, and a coating apparatus for coating a coating slurry on the polyolefin membrane, which is disposed at a spacing position of adjacent drying ovens.

Furthermore, there is provided a coated battery separator, including a polyolefin base material, a heat-resistant coating layer at least one side of the polyolefin base material, and a spray coating layer at at least one side of the polyolefin base material or on the heat-resistant coating layer.

Compared with the prior arts, the present disclosure has the following beneficial effects: for a coated battery separator, a plurality of coating processes are inserted into the heat setting process of the polyolefin base material, such that close contact is achieved between the coating layers and the polyolefin base membrane, and between several composite coating layers, thus effectively improving the heat resistance performance of the coated battery separator and avoiding the problem of powder loss of the conventional sprayed separator. Compared with the traditional coating manner, the coating-composited battery separator prepared by online coating improves heat resistance, moisture, porosity, and consistency. Finally, the safety, cycle performance, high rate discharge performance, and other electrochemical performances of the battery are significantly enhanced. Compared with the existing process, the present process is simpler, increasing the cutting yield greatly.

Furthermore, in the online coating process of the coating-composited battery separator, several coating layers can be coated at one time, which obviously simplifies the process flow, reduces the production costs, reduces the unstable factors of the separator production, and effectively increases the yield of the separators.

BRIEF DESCRIPTIONS OF THE DRAWINGS

DETAILED DESCRIPTIONS OF EMBODIMENTS

Figure 1:
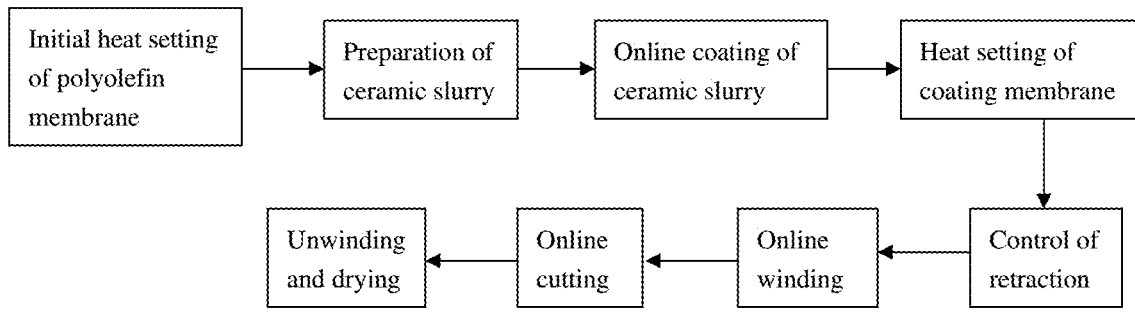
FIG. 1 is a flowchart illustrating a coating process according to example 1 of the present disclosure.

The preferred embodiments of the present disclosure will be detailed below by referring to the accompanying drawings. Before descriptions, it should be understood that the terms used in the specification and the claims shall not be interpreted as limited to a general dictionary meaning but interpreted according to the meanings and concepts corresponding to the technical aspects of the present disclosure based on the principle of allowing the present inventor to appropriately limit the terms for better interpretation. Therefore, the illustrations are made herein only for preferred embodiments for the purpose of descriptions rather than for limiting the scope of protection of the present disclosure. Hence, it should be understood that other equivalents and modifications can be made without departing from the spirit and scope of the present disclosure.

A coating process of a battery separator of the present disclosure sequentially includes: initial heat setting of a polyolefin membrane, online coating of the polyolefin membrane, and heat setting of a coating membrane.

In the present disclosure, the coating process steps are disposed in the heat setting process of the polyolefin membrane to help control synchronization of tension and temperature in the online coating and heat setting, so as to avoid internal stress accumulation and uneven distribution in the base membrane due to several processings. Thus, the flatness of the finished coating membrane is optimized so as to ensure the yield ≥90% in subsequent coating membrane cutting process. Furthermore, after the polyolefin base material undergoes primary heat setting, the internal stress of the base membrane is eliminated, and in the drying process following the coating, high temperature can further eliminate the internal stress caused by stretch or mismatch of base material and coating layer in the coating process, achieving secondary setting. Therefore, mutual regulation can be achieved between the drying and the heat setting such that the prepared coating membrane has good thickness, porosity and consistency.

In order to improve the thermal shrinkage performance of the coating membrane prepared in the above process, further optionally, after online coating of the polyolefin membrane, the coating membrane is controlled to retract. If the polyolefin membrane is subjected to online coating, when the coating slurry is in a liquid state, synchronous retraction is controlled to enable the coating slurry to be in closer contact with the surface of the base membrane, effectively improving the thermal shrinkage performance of the coating membrane.

Specifically, when the coating slurry is in a liquid state, the polyolefin membrane can be retracted 0.1 to 10% along an MD direction, such that the coating slurry is in closer contact with the surface of the polyolefin membrane. After coating, the peeling strength is greatly increased. A good peeling strength can resist the thermal shrinkage tendency of the coating membrane under high temperatures, and improve the heat resistance of the coating membrane. A lower thermal shrinkage rate can greatly reduce an explosion risk caused by short-circuiting of a positive electrode and a negative electrode due to shrinkage of the coating membrane resulting from the abnormal operation of the lithium ion battery under high temperatures.

The polyolefin membrane is not limited to specific types as long as it is the one used frequently in the field. The polyolefin includes but is not limited to: at least one copolymer or a mixture of polyethylene, polypropylene, polybutylene, polypentylene, polyhexene, and polyoctene. When the polyolefin membrane is ultrahigh-molecular weight PE, the molecular weight of the ultrahigh-molecular weight PE is preferably between 0.3 million to 2 million. The membrane formation process of the polyolefin base material is preferably a wet process. A proper amount of solvent is extracted from the base material for volatilization to promote formation of a penetrating hole in the coating layer and the base membrane, avoiding blocking the hole, reducing the air permeability of the coating membrane, and helping transport of the lithium ions.

After the material of the polyolefin membrane is determined, the temperature of the initial heat setting of the polyolefin membrane and the temperature of the heat setting of the coating membrane in the above coating process will be limited accordingly. The temperature of the initial heat setting of the polyolefin membrane is up to a melting point of the material of the corresponding polyolefin membrane. When the coated coating membrane is subjected to heat setting, in order to eliminate most moisture in the coating membrane to help obtain a low-moisture separator in a subsequent drying process, the temperature of the heat setting of the coating membrane is up to the melting point of the material of the polyolefin membrane plus 10° C. That is, when the polyolefin membrane is an ultrahigh-molecular weight PE with a molecular weight between 0.3 million and 2 million, the temperature of the initial heat setting of the polyolefin membrane is controlled to 70° C. to 120° C. whereas the temperature of the heat setting of the coating membrane is controlled to 70° C. to 130° C.

The coating layer of the coating membrane is not limited to specific types as long as it is the one frequently used in the present field. The coating layer of the coating membrane includes but not limited to: any one or combination of two or more of a ceramic coating layer, a PVDF coating layer, a polyacrylic acid coating layer, and an aramid coating layer.

Moreover, the coating manner of the online coating of the polyolefin membrane of each coating layer is not limited as long as the slurry can be coated to the polyolefin membrane. The coating manner may be one or a combination of several spray coating, blade coating, gravure coating, bar coating, slot die coating, extrusion coating, and dip coating.

When the coating layer of the coating membrane is several composite coating layers, compared with the conventional coating process, the polyolefin base material in the present disclosure is firstly slightly dried for heat setting and then coated, such that the coating slurry can better wet the base material. Further, contact between composite coating layers is achieved without completely drying, and thus the slurry at the interface has sufficient time to penetrate each other. After synchronous drying, the bonding force at the interface will be far higher than in the conventional coating process. The better the interface bonding between the ceramic coating layer with good heat resistance and the base membrane is, the larger the peeling strength of the coating layer is, and the more obvious the improvement in the heat resistance performance of the base material is. The sprayed coating layer is liable to powder loss due to non-continuity and irregular distribution, and therefore, the peeled powder may be accumulated on the roller, leading to more particles appearing on the membrane surface, and hence reducing the yield. By online coating technology, close bonding between coating layers can be achieved so as to effectively avoid the above problem.

In the present disclosure, the polyolefin base material and the composite coating layers are dried synchronously. Because the polyolefin base material is not completely heat-set, an internal stress retained for extraction is released in the stretching and extraction process, and hence the separator may have a degree of retraction. The process may occur in synchronization with a change of volume generated by the drying of the composite coating layers, thereby effectively avoiding the edge curling problem easily occurring to a single-face-coated separator. In addition, the slurry and the base material are synchronously retracted such that the coating layers will be more densely stacked, and closer contact between the coating layer and the base membrane can be achieved, thereby effectively improving the thermal shrinkage performance of the coating membrane.

In the present disclosure, after the heat setting of the coating membrane, the steps of online winding, online cutting, unwinding, and drying will be continued to obtain a finished coating membrane. Herein, a finished membrane with proper breadth can be obtained by only one-time online cutting, avoiding wastes of raw materials caused by multiple cuttings in the conventional process. The online winding tension can be controlled to 10 to 20N with the winding speed controlled to 40 m/min; and the online cutting tension is controlled to 3-5N with the cutting speed controlled to 70-90 m/min.

Correspondingly, there is provided a coating system for a battery separator corresponding to the above coating process, which may include: a plurality of drying ovens disposed in a travel route of heat setting of a polyolefin membrane, and a coating apparatus for coating a coating slurry on the polyolefin membrane, which is disposed at a spacing position of adjacent drying ovens.

Specifically, along the travel route of the heat setting of the polyolefin membrane, one or more groups of continuously-disposed small groups are disposed, each small group including a coating apparatus, an initial heat setting drying oven for the polyolefin membrane before initial drying of the coating at the upstream of the coating apparatus, and a coating heat setting drying oven for the coating membrane following the drying of coating at the downstream of the coating apparatus.

Optionally, a plurality of coating apparatuses is disposed continuously at the spacing position of adjacent drying ovens, where the coating manner of the coating apparatus may include gravure coating, bar coating, or extrusion coating and high-pressure atomized spraying such as high speed centrifugation dispersion.

The coating apparatus includes a coating head and a wire bar and the like which are used in the present field. The coating speed of the coating apparatus is controlled to 30-90 m/min. If the thickness of the coating layer is to be changed, the coating speed may be adjusted accordingly.

In order to improve the thermal shrinkage performance of the prepared coating membrane in the above system, along the travel route of the heat setting of the polyolefin membrane, a retraction control apparatus for controlling retraction of the coating membrane is disposed downstream of the coating apparatus in the small groups. After the coating apparatus coats the slurry onto the polyolefin membrane, when the slurry is in a liquid state, the retraction control apparatus can control retraction of the polyolefin membrane. Optionally, the apparatus for controlling retraction of the coating membrane can control the coating membrane to retract 0.1 to 10% along the MD direction when the slurry is in a liquid state. The coating slurry and the polyolefin membrane are retracted together and then heated and dried by the coating heat setting drying oven to achieve a synchronous heat setting.

After coating, the peeling strength is significantly increased. A good peeling strength can resist the thermal shrinkage tendency of the coating membrane under high temperatures, and improve the heat resistance of the coating membrane. A lower thermal shrinkage rate can greatly reduce an explosion risk caused by short-circuiting of a positive electrode and a negative electrode due to shrinkage of the coating membrane resulting from abnormal operation of the lithium ion battery under high temperatures.

As an example, an adsorption wheel pressed onto the surface of the polyolefin membrane is disposed between the coating apparatus and the initial heat setting drying oven/the coating heat setting drying oven. Two adsorption rollers work mainly to control changes in the tension of the polyolefin membrane during a coating process so as to ensure coating stability.

A transfer tank for transferring the coating slurry and a filter may also be disposed near the coating apparatus. In a slurry preparation process prior to coating, by the coating apparatus, the slurry to the polyolefin membrane, the coating slurry is transferred into a 40μ magnetic filter through the transfer tank, and the 40μ magnetic filter filters out large particles and metal impurities in the coating slurry and the like to effectively prevent short-circuiting of the cell cycle due to presence of metal impurities in the separator, and thus improve the cycle stability. Furthermore, in order to avoid decreased production capacity of the separators due to frequent shutdowns for cleaning the magnetic filter, a 40μ magnetic filter may be disposed at the transfer tank to avoid multiple shutdowns for cleaning the filter, thus increasing the production capacity of the separators.

An online thickness gauge and a flaw detector may be further disposed beside the coating apparatus. The thickness gauge is mainly used to perform real-time monitoring for the thickness of the base membrane and the coating membrane, and the flaw detector is used to detect an anomaly of the separator, so as to improve the quality of the finished coating membrane.

An online winding apparatus, an online cutting apparatus, and an unwinding and drying apparatus may be further disposed at an end of the plurality of drying ovens.

In the above coating process, the coating apparatus may prepare a coating-composited battery separator, including a polyolefin base material 13, a heat-resistant coating layer 14 at at least one side of the polyolefin base material 13, and a spray coating layer 15 at at least one side of the polyolefin base material 13 or on the heat-resistant coating layer 14.

Figure 3:
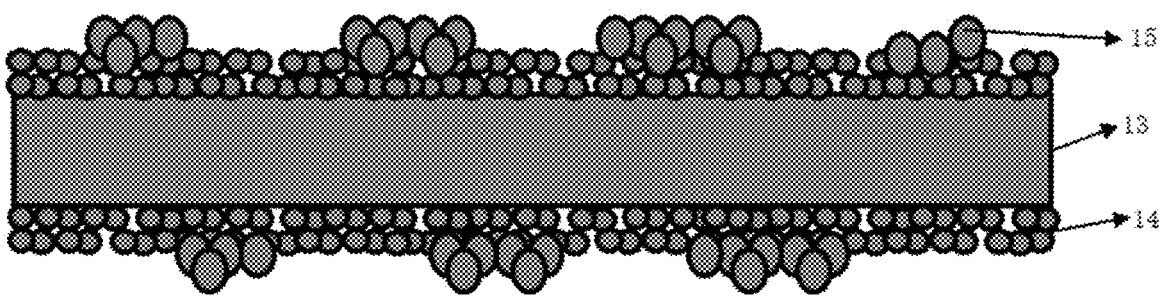
FIG. 3 is a structural schematic diagram illustrating a coating-composited battery separator according to example 2 of the present disclosure.

In this case, the coating-composited battery separator may include a structure 1: the heat-resistant coating layer 14—the polyolefin base material 13—the spray coating layer 15; or include a structure 2 as shown in FIG. 3: the spray coating layer 15—the heat-resistant coating layer 14—the polyolefin base material 13—the heat-resistant coating layer 14— the spray coating layer 15; or include other combinations.

Based on the above coating process or the coating apparatus, in a multi-layer composite coating process, the composite coating layers are dried for heat setting at the same time in a case of not dried or slightly dried. In order to avoid mutual penetration or fusion during a coating or drying and heat setting process of multiple coating layers and thus affecting the properties of the coating-composited separator, it is emphasized that the particle size D1 of the heat-resistant coating layer 14 is less than the particle size D2 of the spray coating layer 15, where D1:D2<2.

Specifically, the heat-resistant coating layer 14 is a ceramic coating layer which includes inorganic matter particles having heat resistance inertness or capable of transporting lithium ions; and the spray coating layer 15 includes high-molecular polymer particles having bonding function.

The ceramic coating layer includes water, a thickener, inorganic matter particles, an adhesive, and a wetting agent, and a solid content of a slurry of the ceramic coating layer is in a range of 30% to 40%. The inorganic matter particles may be one or a combination of several of $SrTiO_3$, $SnO_2$, $Mg(OH)_2$, $MgO$, $Al(OH)_3$, $Al_2O_3$, $SiO_2$, $BaSO_4$, or $TiO_2$ The spray coating layer (15) includes high-molecular polymer particles having a bonding function, a dispersant, a thickener, an adhesive, a wetting agent, and a defoaming agent, and a solid content of a slurry of the spray coating layer is in a range of 5% to 80%.

The high-molecular polymer particles are one or a combination of several of PVDF and PVDF copolymers, acrylic ester homopolymer, or copolymer.

The ceramic coating layer and the spray coating layer 15 are coated online synchronously, and the spray slurry and the ceramic slurry may fuse with each other. If there are many high-molecular polymer particles having a bonding function to penetrate the ceramic particles in the drying process, the bonding performance of the coating-composited battery membrane may be affected. Therefore, further preferably, the inorganic matter particles in the ceramic coating layer have a particle size of 0.01 μm to 10 μm, preferably, 0.02 μm to 2 μm; the high-molecular polymer particles in the spray coating layer 15 have a particle size of 0.5 μm to 10 μm; preferably, 1 μm to 5 μm. The particle sizes of the inorganic matter particles and the high-molecular polymer particles are controlled. The use of the high-molecular polymer particles with larger particle size can effectively prevent the high-molecular polymer particles from being completely immersed into the ceramic coating layer in a coating process, so as to ensure a sufficient bonding force can be generated between the coating-composited battery separator and a pole piece after the cell is subjected to hot press process. In the present disclosure, it is effectively guaranteed that, given a same coating amount of the spray coating layers, the bonding performance of the coating-composited battery separator is improved as possible. Since less amount of the polymer is required when a desired bonding strength is achieved, the ion resistance of the separator can be effectively reduced, thus improving the cycle and rate performance of the battery.

As an example, the slurry of the ceramic coating layer may be coated onto at least one surface of the polyolefin base membrane by one of the following methods: gravure coating, bar coating, extrusion coating, or the like. The spray coating layer may be coated onto at least one surface of the polyolefin base membrane by one of the following methods: high pressure atomized spraying such as high speed centrifugation dispersion.

There is provided a battery including the coating-composited batter separator described in any one item of the above technical solution.

The present disclosure will be further elaborated below with specific examples to help to understand. But, the examples of the present disclosure may take other forms, and the scope of protection of the present disclosure shall not be interpreted as limited to the following implementations. The examples of the present disclosure are used to help those technicians have general knowledge in the relevant field to fully understand the present disclosure.

EXAMPLE 1

The polyolefin membrane was an ultrahigh-molecular-weight PE base membrane with a molecular weight of 2 million, and the coating layer was a ceramic coating layer, which was coated onto one surface of the PE base membrane. The ceramic slurry included water, a thickener, ceramic particles, an adhesive, and a wetting agent, and a solid content was 32%.

As shown in FIG. 1, the main process flow of the example is: initial heat setting of the polyolefin membrane—preparation of the ceramic slurry—online coating of the ceramic slurry—heat setting of the coating membrane—control of retraction—online winding—online cutting—unwinding and drying.

Figure 2:
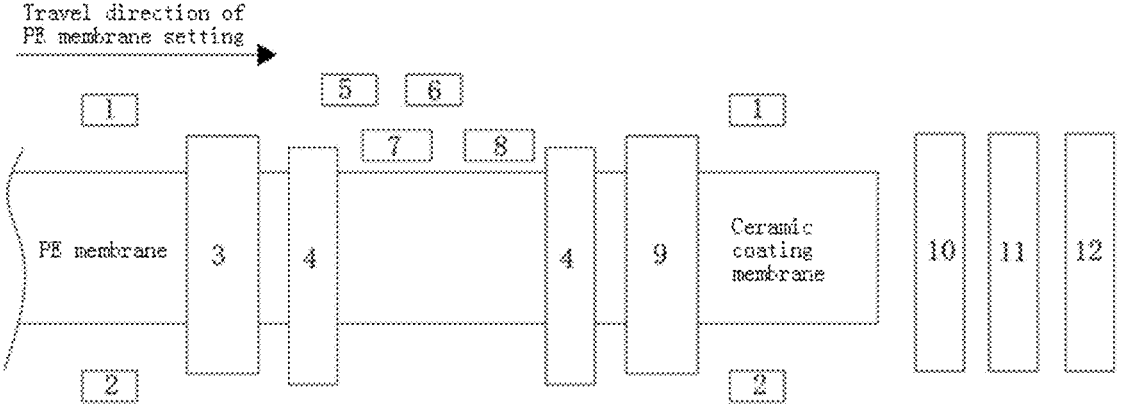
FIG. 2 is a simple view illustrating a coating system according to example 1 of the present disclosure.

As shown in FIG. 2, the coating apparatus in this example includes a flaw detector 1, a thickness gauge 2, an initial heat setting drying oven 3, an adsorption roller 4, a filter 5, a transfer tank 6, a coating apparatus 7, a retraction control apparatus 8, a coating heat setting drying oven 9, an online winding apparatus 10, an online cutting apparatus 11, and an unwinding and drying apparatus 12.

As shown in FIG. 2, the PE membrane went through the steps of material preparation, extrusion, filtering and metering, die extrusion, strip casting and cooling molding, bidirectional stretching, and extraction, which were consistent with the steps prior to the heat setting of the conventional wet separator process. Along the travel direction shown in FIG. 2, the PE membrane first passed through the flaw detector 1 and the thickness gauge 2 for real-time quality monitoring, and then through the initial heat setting drying oven 3 for initial heat setting. At this time, the PE membrane had not been set yet completely. The ceramic slurry prepared in the filter 5 and the transfer tank 6 was coated to the PE membrane by the coating apparatus 7. At the same time, the adsorption roller 4 disposed at the upstream and downstream of the coating apparatus 7 respectively controlled change of the tension during a coating process. When the ceramic slurry was in a liquid state, the PE membrane was controlled to retract along the MD direction by the retraction control apparatus 8, such that closer contact between the coating slurry and the surface of the base membrane was achieved. After retraction control was completed, the PE membrane coated with the ceramic slurry entered the coating heat setting drying oven 9 to complete the coating membrane heat setting, and then passed through the online winding apparatus 10, the online cutting apparatus, and the unwinding and drying apparatus 12 to produce a finished ceramic coating membrane.

A dew point of a dry environment was Td: −49° C., a humidity was H: 0.31%, and a moisture of the coating membrane was tested under 180° C./5 min to be ≤800n ppm. In the present disclosure, the dry environment was controlled to obtain a low-moisture coating membrane, which reduced the side reaction inside the battery and effectively improved the battery performance When the ceramic coating layer was peeled off at the speed of 50 m/min, the peeling strength was greater than 80N/M. The high peeling strength can help bonding between the coating layer and the base membrane, and better resist the thermal shrinkage of the separator under high temperatures, so as to effectively improve the safety of the separator.

EXAMPLE 2

The example was a coating-composited battery separator. As shown in FIG. 3, the coating-composited battery separator included a polyolefin base membrane 13, a heat-resistant coating layer 14 covered on two side surfaces of the polyolefin base material 13, and a spray coating layer 15 sprayed on the heat-resistant coating layer 14, where the heat-resistant coating layer 14 was a ceramic coating layer.

Figure 4:
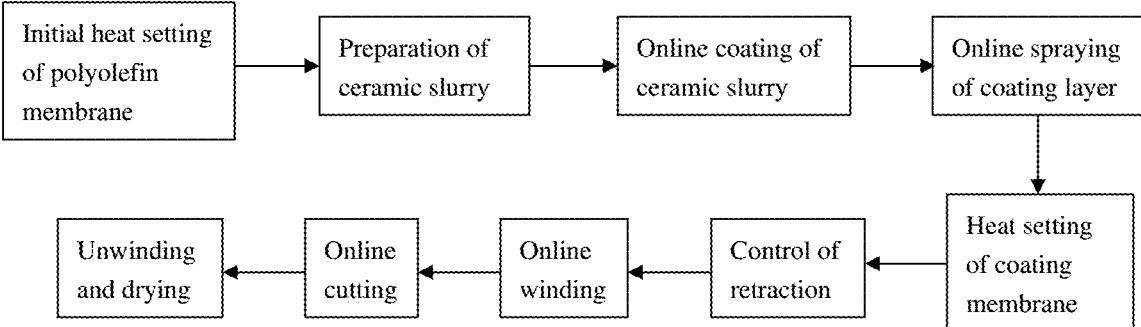
FIG. 4 is a flowchart illustrating a coating process of a composite coating layer according to example 2 of the present disclosure.

As shown in FIG. 4, the main process flow of the example is: initial heat setting of the polyolefin membrane—preparation of the ceramic slurry—online coating of the ceramic slurry—online spraying of the coating layer—heat setting of the coating membrane—control of retraction—online winding—online cutting—unwinding and drying.

When the polyolefin membrane was not completely heat-set, coating of the ceramic coating layer was performed; when the ceramic coating layer was not completely dried, spraying coating was performed.

A ceramic coating slurry with a solid content of 38.6% was prepared, which specifically included the following ingredients: water 61.4%, sodium carboxymethyl cellulose thickener 0.5%, polyether wetting agent 0.1%, aluminum oxide 35%, and acrylic ester adhesive 3%. The slurry preparation was as follows: the thickener was firstly dispersed and dissolved in water to obtain a solution A, then aluminum oxide was dispersed and ground in water to obtain a dispersion B, and then, the above solution A and the dispersion B were mixed and then the adhesive and the wetting agent were added and then mixed fully to produce a ceramic slurry, where the average particle size of the aluminum oxide in the finished slurry was 0.8 μm.

A spray coating slurry with a solid content of 10% was prepared, which specifically included: water 85%, PMMA particles 13.5%, acrylic ester adhesive 1.3%, and polyether dispersant 0.2%. A PMMA emulsion containing the adhesive and the dispersant was dispersed in water to produce a finished slurry, where the average particle size of the PMMA in the slurry was 3 μm.

Figure 5:
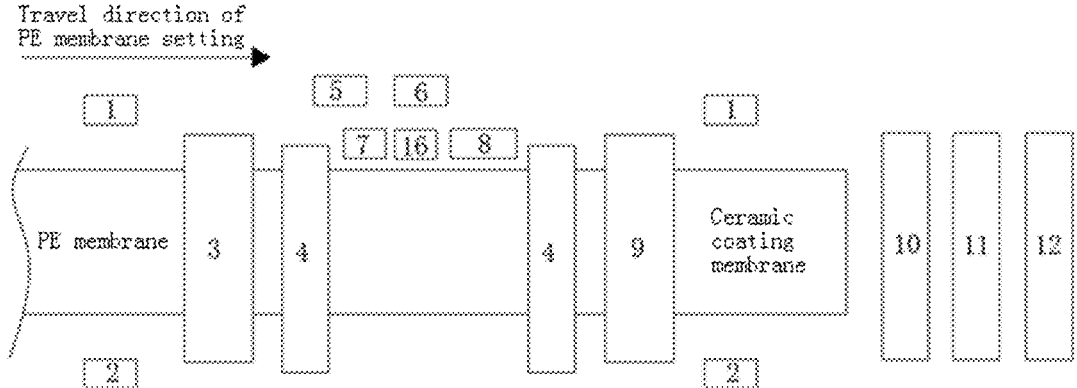
FIG. 5 is a simple view illustrating a coating system for a composite coating layer according to example 2 of the present disclosure.

As shown in FIG. 5, the coating apparatus of this example includes a flaw detector 1, a thickness gauge 2, an initial heat setting drying oven 3, an adsorption roller 4, a filter 5, a transfer tank 6, a coating apparatus 7, a spraying apparatus 16, a retraction control apparatus 8, a coating heat setting drying oven 9, an online winding apparatus 10, an online cutting apparatus 11, and an unwinding and drying apparatus 12.

As shown in FIG. 5, a PE separator of 9 μm was designed. By using gravure rollers, the double-faced ceramic coating was performed online, and then, double face spraying was performed by using a high-speed centrifugal dispersion disk behind the ceramic coating head. The temperature of the heat setting drying oven prior to coating was 80° C. and the heat setting drying oven 9 after coating was three segments of drying ovens with the temperatures of 60° C./80° C./100° C. and production line speed of 50 m/min A total thickness of the dried double-faced ceramic coating layer was 4 μm and the load of the double-faced spraying coating layer was 0.8 g/m².

Control Example 1

The steps of this example are the same as the example 1 except that the average particle size of aluminum oxide in the ceramic coating slurry is 0.8 μm; and the average particle size of the PMMA in spray coating slurry is 0.3 μm.

A PE separator of 9 μm was prepared. Double-faced ceramic coating was performed by using gravure rollers at a coating speed of 50 m/min Three segments of drying ovens with temperatures of 60° C./65° C./70° C. were used. The thickness of the completely-dried separator was 13 μm and the thickness of the ceramic coating layer was 4 μm. Subsequently, double-faced spraying was performed on the double-faced ceramic coating membrane by using a high speed centrifugal dispersion disk, where the load of the double-faced spray coating layer was 0.8 g/m².

Characteristics test was performed on the example 2 and the control example 1, with data shown in Table 1.

| | Air permeability | Thermal shrinkage (130° C./1 H) | | Bonding strength | Internal resistance of separator |
| Item | (S/100 cc) | TD | MD | (N/M) | (Ω*cm⁻²) |
|---|---|---|---|---|---|
| Control example | 230 | 5% | 6% | 3 | 1.9 |
| Example 2 | 180 | 2% | 3% | 6 | 1.3 |

From Table 1, it can be seen that coating was performed using the same aluminum oxide slurry in the example and control example of the present disclosure. Given a same coating amount, the example has better thermal shrinkage performance Given the same coating amount of spaying coating layer, the example in which coating is performed using larger particles online has better bonding strength. On the whole, when the composite layers were prepared by online coating, the incremental value of the air permeability is less and the total resistance value of the separator is lower, and the heat resistance performance is better. This indicates the lithium ion battery manufactured with the coating-composited separator in the present disclosure will be superior to the conventional lithium battery with a composite separator in many aspects such as safety and cycle rate and the like. Furthermore, with the integrated production process of the present disclosure, the production steps will be simpler and the costs will be lower.

The above descriptions are only made to preferred examples of the present disclosure. It should be pointed out that those skilled in the art may also make several improvements and modifications without departing from the idea of the present disclosure, and these improvements and modifications shall all fall within the scope of protection of the present disclosure.

What is claimed is:

1. A coating process of a battery separator, sequentially comprising: initial heat setting of a polyolefin membrane, online coating of the polyolefin membrane, and heat setting of a coating membrane, wherein between the online coating of the polyolefin membrane and the heat setting of the coating membrane, the coating membrane is retracted 0.1% to 10% along a machine direction (MD).

2. The coating process of claim 1, wherein, a temperature of the initial heat setting of the polyolefin membrane is controlled to 70° C. to 120° C., and a temperature of the heat setting of the coating membrane is controlled to 70° C. to 130° C.

3. The coating process of claim 1, wherein, a coating layer of the coating membrane is any one or combination of two or more of a ceramic coating layer, a polyvinylidene difluoride (PVDF) coating layer, a polyacrylic acid coating layer, and an aramid coating layer.

4. The coating process of claim 1, wherein, the online coating of the polyolefin membrane is performed in a manner which comprises any one or a combination of several of spray coating, blade coating, gravure coating, bar coating, slot die coating, extrusion coating and dip coating.

\* \* \* \* \*